Feb. 2, 1971 P. H. HOWARD 3,560,930

METHOD AND APPARATUS FOR REDUCING DATA IN A PATTERN RECOGNITION SYSTEM

Filed Jan. 15, 1968 3 Sheets-Sheet 1

INVENTOR

PHILIP H. HOWARD

BY Homer L. Knearl

AGENT

United States Patent Office 3,560,930
Patented Feb. 2, 1971

3,560,930
METHOD AND APPARATUS FOR REDUCING DATA IN A PATTERN RECOGNITION SYSTEM

Philip H. Howard, Rochester, Minn., assignor to International Business Machines Corporation, Armonk, N.Y., a corporation of New York Filed Jan. 15, 1968, Ser. No. 697,841
Int. Cl. G06k 9/00
U.S. Cl. 340—146.3 11 Claims

ABSTRACT OF THE DISCLOSURE

A data reduction method in pattern analysis is disclosed herein in three separate physical embodiments. The method is to interleave data reducing measurements. Adjacent measurements are nonoverlapping and are interleaved so that they are not in horizontal or vertical alignment. Since the measurements are not so aligned, they produce a more accurate reduction of data. In other words, the position of the pattern under the data reducing measurements has little effect on the reduced data. The interleaving may be accomplished using any type of scanner such as cathode ray tube, linear array of photosensitive devices or retina array of photosensitive devices. Video data from these scanners can be either temporarily stored and then selected to form the data reducing measurements, or as in the retina scanner the data can be directly reduced by measurements operating off of the retina.

INTRODUCTION

This invention relates to making data reducing measurements on patterns in a pattern recognition system. More particularly, the invention relates to making interleaved data reducing measurements on patterns.

To analyze video data from a scanner the data is digitized and operated on as if it were in a two dimensional digital array, so that a two dimensional matrix of black and white bits of information are set up. The black and white bits would form the pattern of the character scanned by the scanners. These black and white bits must then be analyzed by the pattern recognition system. To simplify the recognition system and to reduce its cost it is desirable to reduce the amount of black and white digitized data which the system operates on. This can be done by using data reducing measurements.

Until now, data reducing measurements have been largely one of two types. First, a rectangular matrix of black and white bits would be reduced to a single black or white bit of information according to the number of black bits in the rectangular measurement. For example, a rectangular measurement of four bits might be converted to a single black bit if three or more out of the four bits are black. These data reducing rectangular measurements would be stacked horizontally and vertically relative to each other. This creates a problem because strokes of alphabetic characters are very often horizontal and vertical. Therefore, it is possible for a single stroke occupying a width of two black bits to be split down the center by adjacent data reducing measurements. The result could be that the adjacent data reducing measurements would reduce to white completely breaking the character. Alternatively only one of the measurements would reduce to black which would have the effect of thinning out a stroke of the character. As a third alternative both could indicate black which would have the effect of widening the stroke.

Another data measurement often used is a cross where a single bit position is given a black weighting dependent upon its blackness and the blackness of data bits north, east, south and west of it. These schemes, however, have been merely black weighting schemes for a center bit since they were performed for all bits in the original digitized array of black and white bits. There is no reduction of data at all, and the measurements are not data reducing measurements but instead data transforming measurements.

It is an object of the invention to make data reducing measurements on patterns which measurements accurately retain the shape and continuity of the pattern operated on.

It is another object of the invention to make data reducing measurements on patterns where the measurements are interleaved and thereby adjacent measurements are not horizontally or vertically aligned.

SUMMARY OF THE INVENTION

In accordance with this invention the above objects are accomplished by using data reducing measurements on patterns wherein the measurements are interleaved so that adjacent measurements are not positioned either directly horizontal or directly vertical from each other. The shape of the data reducing measurements is not critical; however, the shape must be such that (1) the measurements may be fitted together so as to cover all of the pattern, (2) the measurements do not overlap and (3) adjacent measurements are not vertically or horizontally aligned.

The great advantage of interleaved data reducing measurements is that the position of the measurements over the pattern to be operated on does not materially affect the quality of the reduced data. The pattern operated on may be shifted about relative to the data reducing measurements and the main effect will be to shift the pattern of the reduced data. The content of the reduced data will be largely unaffected. The number of variations in the reduced pattern (other than simple shifts) will not exceed the number of bits in the data reducing measurement. Furthermore, by interleaving the data reducing measurements a more accurate resolution of the pattern is retained in the reduced data. The interleaving of measurements prevents involuntary breaking of the continuity in the character in the reduced data. Furthermore, the interleaving more accurately preserves the contour of a pattern.

The foregoing and other objects, features and advantages of the invention will be apparent from the following more particular description of preferred embodiments of the invention as illustrated in the accompanying drawings.

DESCRIPTION

Figure 1:
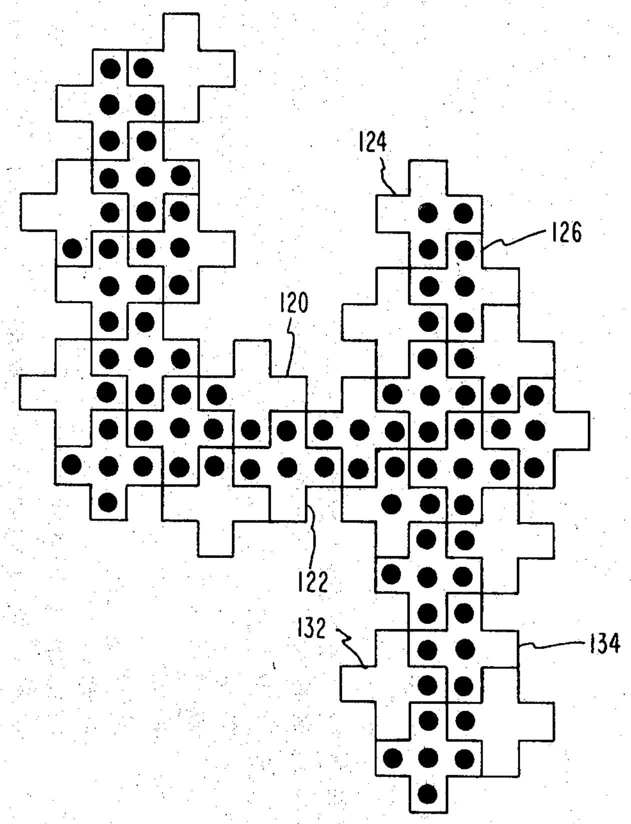
FIG. 1 shows a preferred embodiment of interleaved data reducing measurements placed over the digitized pattern of a numeral 4.
Figure 2:
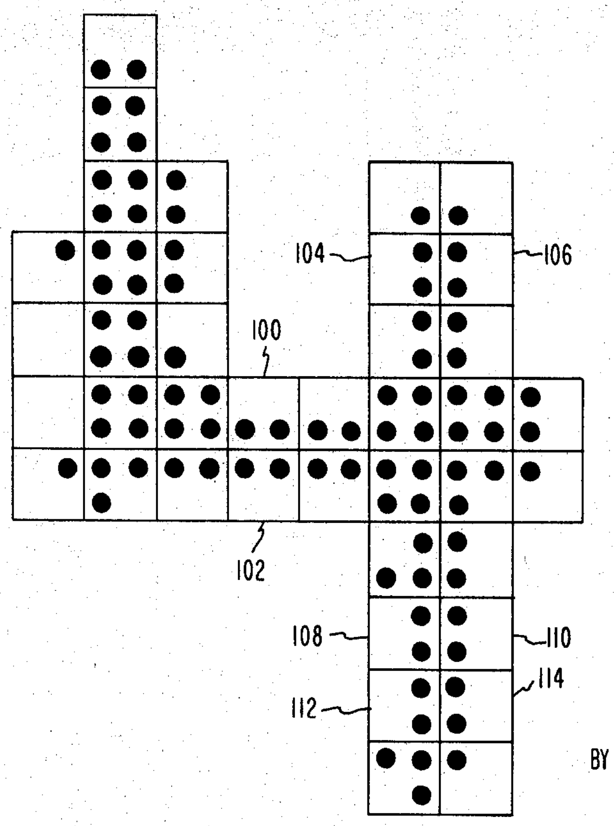
FIG. 2 PRIOR ART
FIG. 2 shows a typical prior art data reducing measurement having no interleaving and placed over the same numeral 4 as shown in FIG. 1.

Referring now to FIGS. 1 and 2, the advantages of the data reducing measurement method of my invention over the data reducing measurements in the prior art will be shown. For purposes of FIGS. 1 and 2 it is assumed that a numeral 4 has been scanned and digitized into black or white bits in a two dimensional array. Black bits are shown as black circles. In FIG. 1 the inventive data reducing measurements are superimposed on the digitized 4. The measurements consist of five black or white bits in the shape of a cross. In FIG. 2 a typical prior art data reducing measurement is superimposed on the same digitized numeral 4. This measurement consists of four black or white bits in the shape of a square.

The problem with the prior art data reduction measurement can readily be seen in FIG. 2 when it is noted that the right-hand vertical bar of the 4 and the horizontal bar of the 4 are split by the prior art data reducing measurements. For example, measurement 100 and measurement 102 each contain two black bits as a piece of the horizontal stroke in the numeral 4. If this data were reduced to a gray level, it would be a very light gray and not truly depict the solidness or continuity of the horizontal stroke of the 4. In a worse case, if the data were simply reduced to a single indication of black or white based on three or more bits in a measurement being black, then both measurements 100 and 102 would be white. This, of course, would result in a break in the continuity in the horizontal stroke of the numeral 4. The result would probably be an erroneous recognition of the 4 or no recognition at all. This same effect would also occur on the right-hand vertical stroke 4 at measurement pairs 104/106, 108/110 and 112/114.

Of course, in FIG. 2 the digitized numeral 4 could be shifted into better registration to the data reducing measurements. However, in actual practice it is just as likely unless some registration action is taken that the numeral 4 will be registered on the reducing measurements as shown in FIG. 2. The significant thing is then that the position of the numeral 4 relative to the data reducing measurements of the prior art has a very material effect on the quality of the output data from the data reducing measurements.

Referring now to FIG. 1, the same digitized numeral 4 will be reduced to data by the inventive interleaved data reducing measurements. The data reducing measurement used in FIG. 1 is a cross which covers five bits of black and white data. The crosses are interleaved so that the center of adjacent crosses are never horizontally or vertically aligned. Centers of horizontally or vertically aligned crosses are separated by four black or white digital bit positions.

An examination of FIG. 1 will reveal that this interleaving pattern results in most of the data reducing measurements having four or five black bits all along the entire length of strokes of the numeral 4. For example, in the horizontal stroke of the numeral 4 the measurement 120 contains two black bits while the immediately adjacent interleaved measurement 122 contains four black bits. Therefore, while the data reducing measurement 120 may essentially show white for the horizontal stroke, the continuity of the horizontal stroke will be preserved by a very strong black indication by data reducing measurement 122. This result is in strong contrast to the result achieved in FIG. 2 with the prior art reducing measurements where the continuity of the horizontal stroke would very likely be broken by the data reducing measurements.

Examining the right-hand vertical stroke of the numeral 4 in FIG. 1, a similar improvement in the quality of reduced data is apparent. For example, the measurement 124 contains three black bits—a relatively strong black indication—while the measurement 126 contains four black bits—a very strong black indication. This is in contrast to measurements 104 and 106 in FIG. 2 both of which show the very weak black measurements. A similar result is apparent when contrasting measurements 132 and 134 in FIG. 1 with measurements 112 and 114 in FIG. 2.

It is important to note also that a shifting of the numeral 4 in FIG. 1 either horizontally or vertically would not appreciably reduce the quality of data produced by the measurements. The effect would simply be to shift the significant data to other data reducing measurements. In other words, a shift in the digitized numeral 4 in FIG. 1 does not appreciably affect the quality of the reduced data but instead merely causes a similar shift in position by the reduced data. There are only five shift positions that need be considered to represent all of the possible variations in the reduced pattern.

Figure 3:
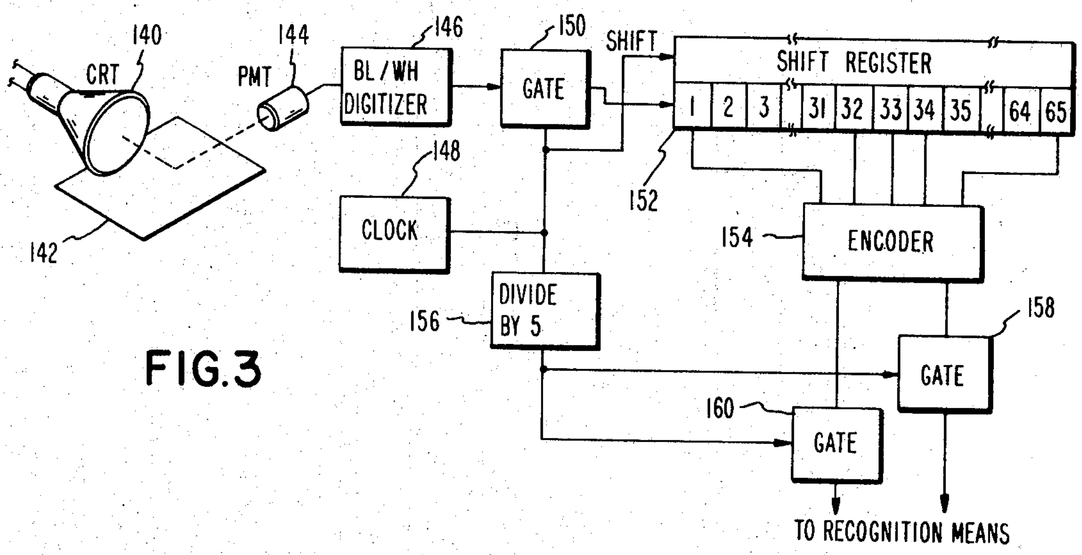
FIG. 3 shows a preferred embodiment of the invention wherein the scanning is accomplished by a cathode ray tube.

In FIG. 3, a preferred embodiment for implementing the data reducing measurements in FIG. 1 uses a cathode ray tube to raster scan patterns. For purposes of FIG. 3, it is assumed that the cathode ray tube 140 scans vertically across patterns such as the numeral 4 which are printed on a document 142. A given vertical scan through a pattern is divided into 32 black or white bits. Black or white designation depends upon the amount of reflected light picked up by photomultiplier tube 144. After each vertical scan the cathode ray tube beam is indexed a few mils horizontally and another vertical scan proceeds through the character. After scanning a character, the character will appear as digitized black and white bits such as the numeral 4 shown in FIG. 1.

To digitize the video signal produced by the photomultiplier tube 144 a black/white digitizer 146, a clock 148 and gate 150 are used. The black/white digitizer is merely a threshold circuit or a voltage discriminator which converts the signal from the photomultiplier tube 144 into a two level signal. One level of the signal out of the digitizer 146 represents black and the other level represents white. This two level signal from the digitizer 146 is then divided into time increments by the gate 150 which is controlled by clock 148. The gate and clock cooperate to split a vertical scan by the cathode ray tube 140 into 32 black or white bits.

Each bit out of the gate 150 is passed into the shift register 152. The shift register is advanced by a shift pulse each time the gate 150 is energized. The shift register 152 contains 65 stages. Stages 1, 32, 33, 34 and 65 will form a five bit cross. In other words, the five lines out of shift register 152 represent the five bits in the data reducing measurement shown in FIG. 1.

The five bits in the data reducing measurement are encoded by encoder 154 into two binary bits indicating the gray level for the data reducing measurement. The code is as follows:

TABLE 1

| | | | | | | |
|---|---|---|---|---|---|---|
| Input bits | 0 | 1 | 2 | 3 | 4 | 5 |
| Output X | 0 | 0 | 0 | 1 | 1 | 1 |
| Output Y | 0 | 0 | 1 | 0 | 1 | 1 |

Figure 4:
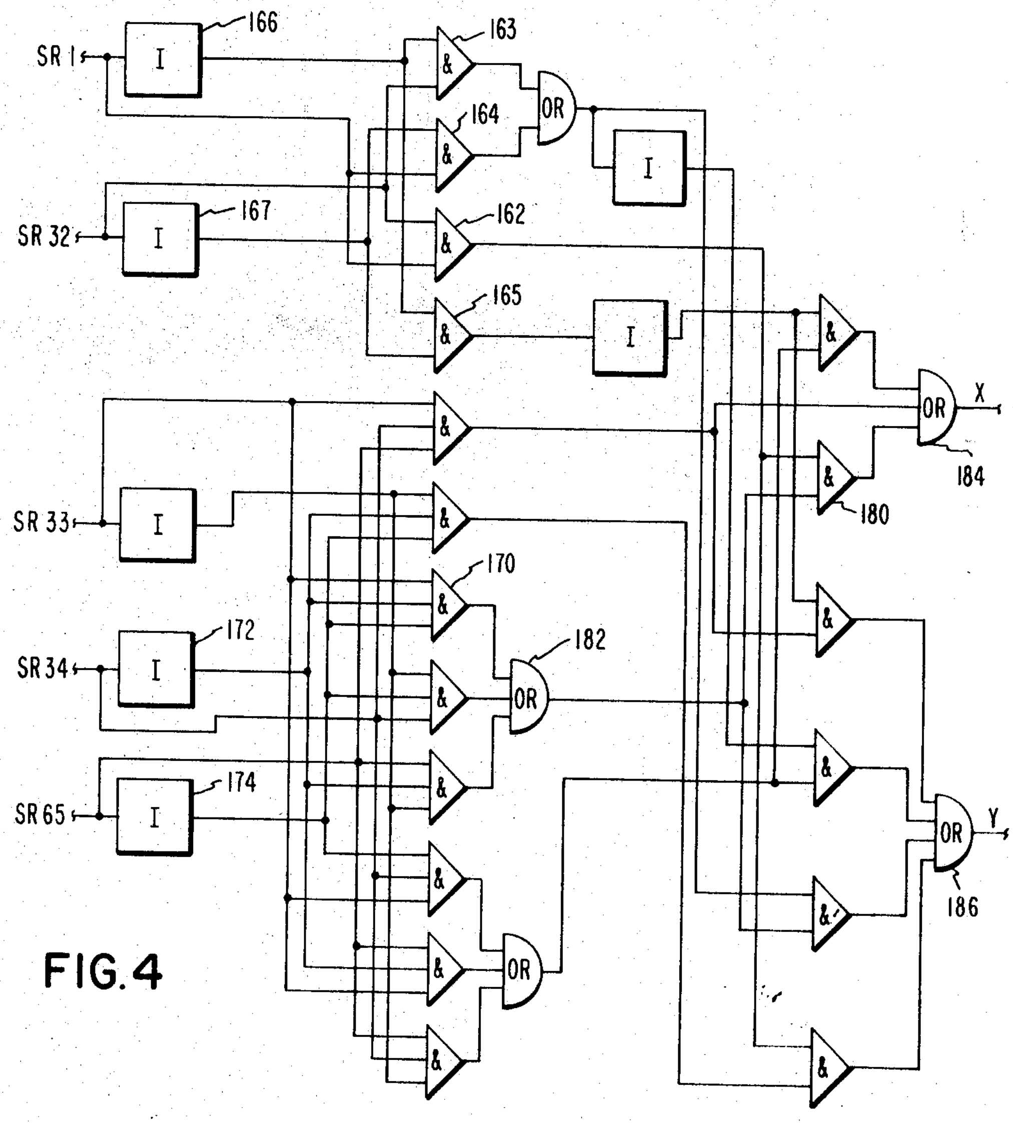
FIG. 4 shows the details of the encoder used in FIG. 3.

This code is implemented in the logic circuits of FIG. 4.

The encoder 154 will be producing a two bit output code each time the shift register 152 is advanced. Of course, not all of this information is necessary since the data reducing measurement centers are five vertical bits apart. Therefore, the output of the encoder need only be sampled every fifth shift advance of shift register 152.

To gate out only the desired information the frequency divider 156 divides the clock frequency 148 by five and enables gates 158 and 160. Therefore, the gates 158 and 160 pass the output from the encoder 154 upon every fifth shift in shift register 152.

This technique of implementing the data reducing measurements will produce spurious information at the top or bottom of each vertical scan by the cathode ray tube 140. However, it is assumed that the cathode ray tube scanning will be centered on a pattern and accordingly, the top and bottom bits should be all white. Thus, a combination of all white bits would make no difference to the data reduction.

Now referring to FIG. 4, the encoder receives its five input lines from the shift register 152 (FIG. 3). These lines have been labeled according to the shift register stage of their origin as SR1, SR32, SR33, SR34 and SR65. In practice it makes no difference which of the shift register stages is hooked to which input of the encoder. The X and Y outputs of the encoder are shown at the right-hand side of FIG. 4.

The operation of the encoder in FIG. 4 can be understood by taking a simple example. Assume that the shift register 152 contains a one or a black bit in shift register stages 1, 32 and 33, plus a white or zero bit in stages 34 and 65. The one bits on the inputs SR1 and SR32 will cause AND gate 162 to have an output. AND gates 163, 164 and 165 will have no output because, in each case at least one of their inputs comes from inverter 166 or 167. Similarly, in the lower half of FIG. 4, only AND gate 170 will have an output as it receives an input from SR33, inverter 172 and inverter 174.

The output from AND gate 162 is passed to AND gate 180, while the output from AND gate 170 passes via OR gate 182 to AND gate 180. Therefore, AND gate 180 is enabled and OR gate 184 has an output. On the other hand, OR gate 186 does not have an output as none of its input AND gates are enabled. Therefore, the output code for three black bits is X=1, Y=0 as indicated previously in Table 1. Any other combination of three black bits on the five input lines to the encoder will have produced the same result.

Although a particular embodiment has been shown for the encoder 154 (FIG. 3) in FIG. 4 it will be appreciated by one skilled in the art that any number of codes might be used to indicate the black levels. Also a sampling-counting arrangement could be used to count the number of black bits in the data reducing measurement. Further, a thresholding type of measurement might be made. For example, if three or more of the five bits are black, indicate black for the entire measurement. This could be done in FIG. 4 by using only the X output line. The X output line is always energized when three or more of the five bits are black.

Figure 5:
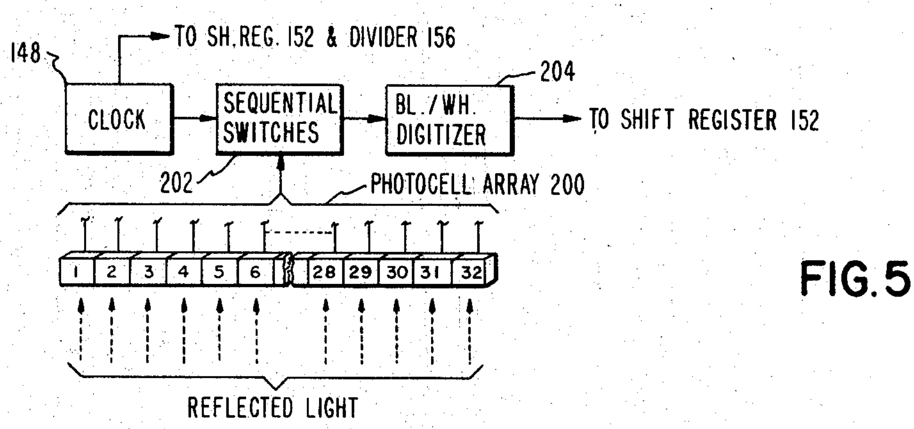
FIG. 5 shows an embodiment of the invention wherein the scanning is accomplished by a linear array of photocells.

An alternative input to the shift register 152 in FIG. 3 is the linear array of photocells shown in FIG. 5. The photocell array 200 is made up of 32 separate cells. The scan of these cells would be equivalent to the raster scan by the cathode ray tube 140 (FIG. 3). In this case the document with the character printed thereon would be moved under the photocells 200. The clock 148 would now be used to control the sequential switches 202. A simple implementation of the sequential switches would be the use of a counter with its count outputs attached to gates to sequentially gate the 32 photocells as the clock advanced the counter through 32 counts.

The serialized analog video information out of the sequential switches would then be black/white digitized by digitizer 204. The resulting output from the digitizer 204 would be same as the output from gate 150 in FIG. 3. Accordingly, the black/white bits from the digitizer 204 in FIG. 5 would be sent to the shift register 152 in FIG. 3. Similarly, the clock 148 would be advancing the shift register 152 in FIG. 3 and also driving the frequency divider 156 in FIG. 3.

Figure 6:
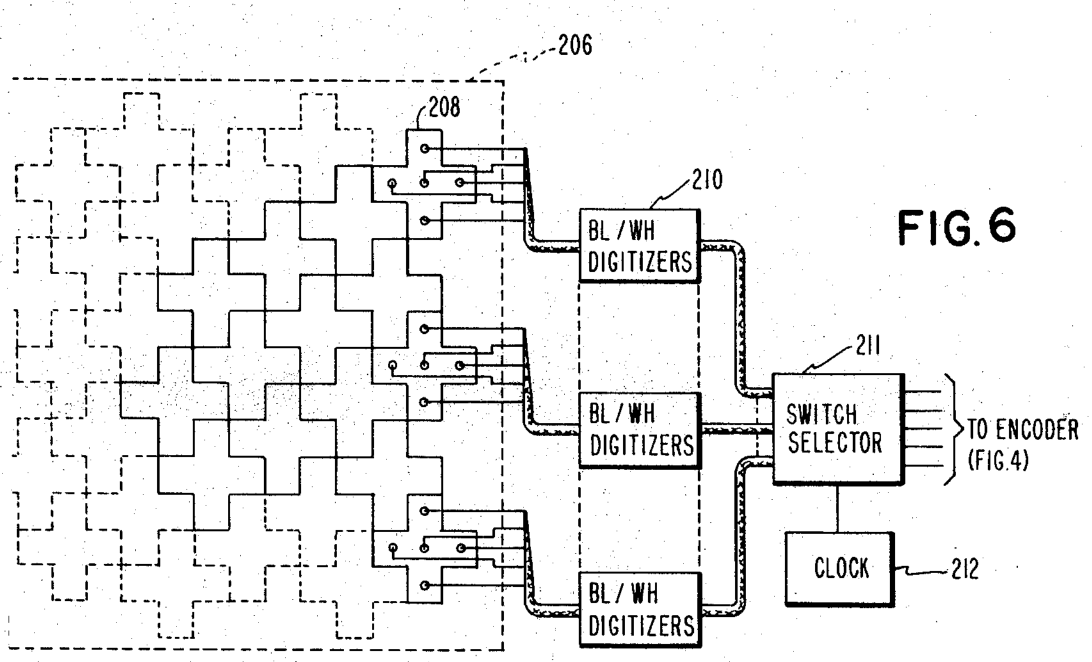
FIG. 6 shows a third embodiment of the invention wherein scanning is accomplished by a retina and the retina output is immediately operated on to reduce data.

Referring now to FIG. 6, another embodiment for implementing the data reducing measurement of FIG. 1 is shown. In FIG. 6 the input is a retina scanner where each bit position contains a photo pickup such as a photocell. The pattern to be recognized would be placed directly on the retina 206. The photocells in the retina are grouped into sets of five to implement the data reducing measurements. For example, the five photocells from measurement 208 are passed to five black/white digitizers or voltage discriminators 210. The voltage discriminators in the block 210 simply convert the output of the five photocells in the measurement 208 to five black or white signals. These five black or white signals are then passed to a switch selector 211. The switch selector 211 is driven by a clock 212 to serially sample each data reducing measurement in the retina 206. Thus a given clock pulse from 212 gates out of the switch selector the five bits of a data reducing measurement. These five bits would go directly to the encoder inputs shown in FIG. 4.

Figure 7:
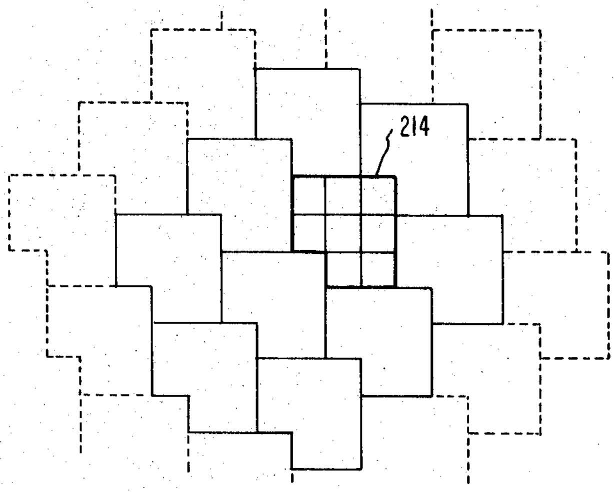
FIG. 7 shows an alternative interleaved data reducing measurement.

All of the above embodiments have been directed to the interleaved data reducing measurement as shown in FIG. 1. However, any interleaved data reducing measurement where the center of adjacent measurements are not either vertically or horizontally aligned would be usable. For example, the interleaved data reducing measurements as shown in FIG. 7 might be used instead of those shown in FIG. 1. These measurements are made up of eight black or white bits as shown particularly in measurement 214. The center of the horizontally or vertically aligned measurements of this type would be eight bit positions apart or another words, separated by seven bits of black or white information. It will be appreciated by one skilled in the art that many other interleaved data reducing measurements can be conceived.

While the invention has been particularly shown and described with reference to preferred embodiments thereof, it will be understood by those skilled in the art that various changes in form and details may be made therein without departing from the spirit and scope of the invention.

What is claimed is:

1. In a pattern-recognition process including the steps of scanning an input pattern and digitizing elemental areas of the pattern into pattern digital bits and background digital bits, a shape-preserving data-reducing method comprising the steps of:

collecting the digital bits in a plurality of mutually exclusive interleaved measurement sets, adjacent ones of the measurement sets being nonoverlappingly abutted and being aligned at an angle other than horizontal or vertical;

measuring the number of pattern digital bits collected in each interleaved measurement set; and generating, for each measurement set, an output signal indicative of the number of pattern digital bits in that set, such that the totality of output signals define a consolidated image having substantially the same shape as the input pattern.

2. The method of claim 1 wherein the digital bits are collected in measurement sets of five digital bits per set in the shape of a cross.

3. The method of claim 1 wherein said measuring step measures the number of pattern bits to indicate the exact number of pattern bits in a measurement set.

4. The method of claim 1 wherein said measuring step measures the number of pattern bits to indicate when the number of pattern bits in a measurement set exceeds a predetermined number.

5. In a pattern recognition ssytem having means for digitizing an analog pattern into pattern digital bits and background digital bits, apparatus for reducing the digital information to less data containing equivalent information comprising:

means for sampling the digital bits in sets, each set forming an interleaved data reducing measurement set;

encoding means for combining digital bits of each measurement set with other digital bits of the same set so as to form reduced data containing information equivalent to the digital bits; and control means for controlling said sampling means to interleave the measurement sets of digital bits so that adjacent measurement sets are nonoverlappingly abutted and aligned at an angle other than horizontal or vertical, said control means being adapted to transmit the reduced data so as to define a reduced pattern having substantially the same shape as the analog pattern.

6. The apparatus of claim 5 wherein said encoding means encodes each measurement set into digital information indicating the number of pattern bits in the measurement set.

7. The apparatus of claim 5 wherein said encoding means encodes each measurement set into digital information indicating when the number of pattern bits in a measurement set exceeds a predetermined number.

8. The apparatus of claim 5 wherein said sampling means samples five digital bits in a set to form a data reducing measurement set in the shape of a cross.

9. The apparatus of claim 5 wherein said sampling means comprises:

first gating means for gating to said encoding means a data reducing measurement set for each digital bit position, the data reducing measurement set being five digital bits in the shape of a cross;

second gating means for gating reduced data of interleaved measurement sets from said encoding means.

10. The apparatus of claim 9 wherein said control means comprises:

a clock for energizing said first gating means at every digital bit position;

a frequency dividing means responsive to said clock for energizing said second gating means at every fifth digital bit position so that said second gating means only passes reduced data from interleaved measurement sets.

11. In a pattern-recognition system having means for executing a scan over an input pattern, apparatus for reducing the data from said scanning means while maintaining the shape of said pattern, said apparatus comprising:

means for extracting video information from said scanning means in a plurality of consolidation cells, each cell having a plurality of arms extending from a center;

encoding means for generating a plurality of consolidated signals, each signal being representative of a combination of video information from a corresponding consolidation cell with other video information from the same cell;

means for selecting predetermined ones of said consolidation cells such that said selected cells define a disjoint, interleaved tesselation of said input pattern, the centers of said selected cells being obliquely aligned with respect to said scan; and means controlled by said selecting means for gating only those of said consolidated signals associated with said selected cells.

References Cited

UNITED STATES PATENTS

| | | | |
|---|---|---|---|
| 2,928,073 | 3/1960 | Greanias | 340—146.3 |
| 3,196,398 | 7/1965 | Baskin | 340—146.3 |
| 3,258,581 | 6/1966 | Buell | 340—146.3 |
| 3,277,286 | 10/1966 | Preston | 340—146.3 |

THOMAS A. ROBINSON, Primary Examiner